Aug. 9, 1966  A. GAMES  3,265,891
COPY APPARATUS WITH MEANS TO APPLY A VAPORIZING AGENT
TO THE ORIGINAL PRIOR TO EXPOSURE TO INFRARED
RADIATION WHILE ADJACENT A COPY SHEET
Filed Jan. 29, 1962
2 Sheets-Sheet 1
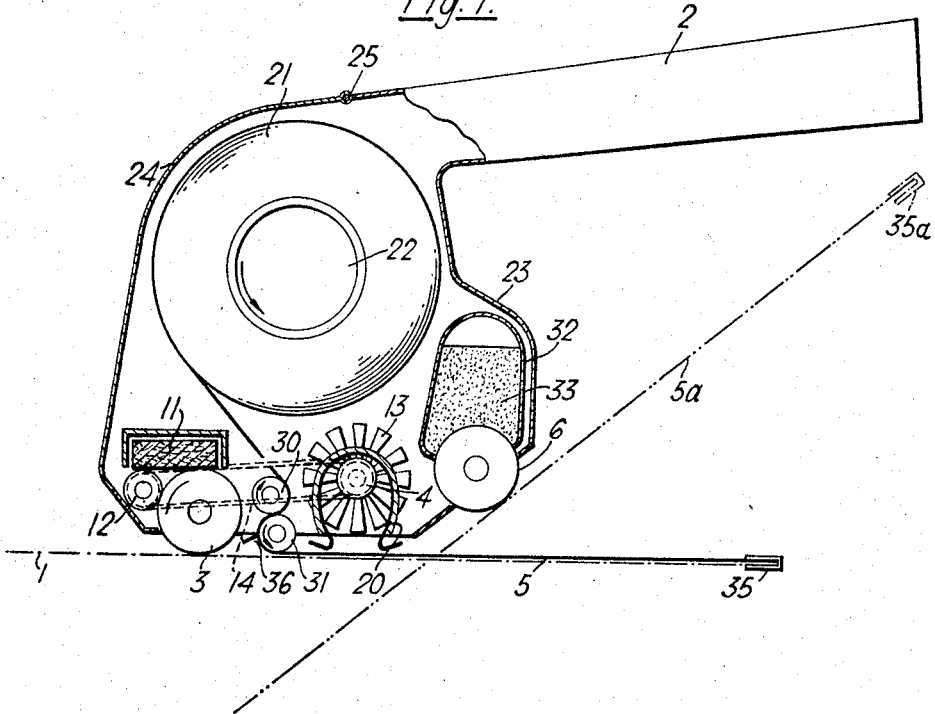
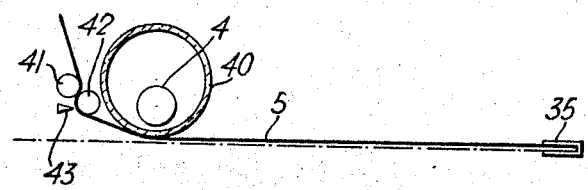

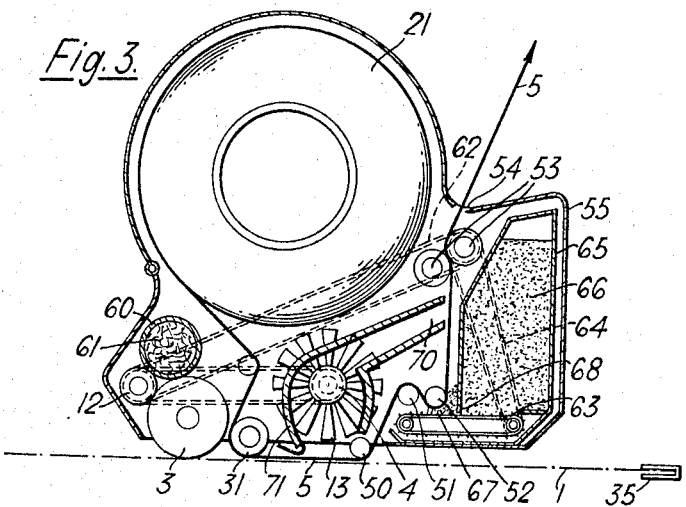

United States Patent Office 3,265,891
Patented August 9, 1966

3,265,891
COPY APPARATUS WITH MEANS TO APPLY A VAPORIZING AGENT TO THE ORIGINAL PRIOR TO EXPOSURE TO INFRARED RADIATION WHILE ADJACENT A COPY SHEET
Abraham Games, London, England, assignor to Imagic Limited, London, England, a British company
Filed Jan. 29, 1962, Ser. No. 169,358
Claims priority, application Great Britain, Feb. 1, 1961, 3,811/61
7 Claims. (Cl. 250—65)

This invention relates to the copying of originals, for example in the form of printed matter, pictorial designs, photographs and the like. It is particularly concerned with a form of process described in my copending application No. 6,546 filed on February 3, 1960. In one of the forms of process described in this earlier application the surface bearing the original to be copied is located in contact with an unsensitized surface on which the copy is to be produced and the original is then subjected to heat in such a way that a vaporizing agent is caused to distil from the original to the copy surface over areas representative of the original design. In each form of apparatus described in the previous application it is necessary to feed the original into the body of the apparatus itself and this is not always convenient or possible.

According to the present invention a film of vaporizing agent is applied to the surface of an original by a member which moves in relation to the original simultaneously with the paying out of a strip of copy material into contact with the original at a point just to the rear of the member; the original is then subjected to infrared radiation so that vaporizing agent is caused to distil on to the copy material over areas representative of the original to be copied to produce a latent image, after which the latent image is developed. With such a method it is possible to produce a copy of an original while the original rests on a supporting surface merely by moving the copying apparatus over the surface of the original or, alternately, by moving the original past the apparatus. In either case it is not necessary to feed the original into the apparatus itself.

Apparatus for carrying out this process in accordance with the invention comprises a roller for applying vaporizing agent to the surface of the original while the latter is held on a support, a guide for a strip of copy material situated to the rear of the roller, a mounting for a reel of copy material strip for feeding to the guide and a source of infrared radiation extending across the apparatus to the rear of the guide. These components are so arranged that as the result of relative movement between the apparatus and the original a film of vaporizing agent is applied to the surface of the original by the roller, a length of copy strip is paid out into contact with the previously treated original and infrared radiation is directed through the copy material on to the original so as to produce the latent image on the surface of the copy material in contact with the original. It is then only necessary ot develop the latent image thus produced on the copy material. For this purpose the apparatus may include an inking device and if necessary the inked image may be fixed by means of heat from the same source of infrared radiation.

In the simplest form of apparatus in accordance with the invention the inking device is a roller by means of which the latent image may be developed during a subsequent passage or passages of the apparatus in relation to the copy material. In other words, the first passage applies the film of vaporizing agent to the original, pays out the copy strip and produces the latent image while the second or subsequent passages ink the latent image which may then be fixed by a final passage, using heat from the source of infrared radiation for the purposes of fixing. With this form of apparatus it is necessary to hold the end of the copy strip in position on the original before starting the copying operation. The first passage then withdraws the strip and leaves it in contact with the original with the latent image on the undersurface of the strip adjacent the original. The length of copy strip bearing the latent image must then be torn from the remainder and inverted in readiness for the following passage or passages in which it is inked.

In an alternate form of apparatus the inking and fixing are carried out in the same operation as the production of the latent image. For this purpose the apparatus includes a further guide to the rear of the source of infrared radiation, whereby the strip of copy material may be fed back into the apparatus after production of the latent image. The inking device is positioned adjacent the further part of the strip and the apparatus also includes means for fixing the developed image. In practice a duct may extend from the source of infrared radiation to a point in the path of the strip of copy material beyond the inking device. This permits the passage of heat from the source of infrared radiation which then fixes the developed image.

Constructions of apparatus in accordance with the invention will now be described in more detail by way of example with reference to the accompanying drawings, in which:

FIGURE 1 is a view partly in section showing one form of apparatus;

FIGURE 2 is a detail view showing a modification of part of the apparatus of FIGURE 1;

FIGURE 3 is a sectional view of an alternate form of apparatus including a device for inking a copy strip within the body of the apparatus;

FIGURES 4 and 5 are sectional views of modified forms of inking device for use in the apparatus of FIGURE 3; and FIGURES 6 and 7 are diagrammatic views to a reduced scale illustrating the mode of operation of the apparatus of FIGURE 3.

Turning first to FIGURE 1, the apparatus shown is intended to be moved by hand across the surface of an original shown in dotted lines at 1 and mounted on a supporting surface. For this purpose the apparatus includes a handle 2. The remainder of the apparatus is shown in section. The main components are a roller 3 for applying a vaporizing agent to the surface of the original, a lamp 4 for heating the surface of the original to cause selective distillation of the vaporizing agent and thus to form a latent image on the underside of a strip of copy material 5 and an inking roller 6, by means of which powdered ink is applied to the latent image in order to develop it.

Referring to the construction in more detail the roller 3 obtains its supply of vaporizing agent from a pad 11 which is impregnated with a suitable liquid. This liquid may be any one of those disclosed in the above identified copending application, such as the hydrogenated terphenyl sold by Monsanto Chemicals under the trademark H.B.40. The roller 3 and a doctor roller 12 both bear against the pad 11, causing it to vibrate slightly. The doctor roller serves to even out the film on the surface of the roller 3 and to remove any excess. The roller 3 is driven by contact with the surface of the original as the apparatus is moved across the latter and this in its turn drives the roller 12. The roller 12 is used as the source of drive for a double fan one half of which is seen at 13 and which directs a stream of cooling air on to the copy strip 5 to assist the condensation of vaporizing agent in the formation of a latent image. For simplicity a belt drive 14 is shown in dotted lines between the rollers 12 and the fan 13 although a more positive drive, for example by means of a light chain or a train of gearing, may be used if required.

The lamp 4 constitutes a source of infrared heat and extends across the width of the apparatus, being provided with a reflector 20 which directs the heat downwardly against the surface of the original. The fan 13 is mounted at the open ends of the reflector 20 so as to direct a stream of air downwardly and across the surface of the copy strip 5.

The copy strip 5 is drawn from a reel 21 mounted on a hub 22 turning within the casing 23 of the apparatus. A portion 24 of the casing is hinged at 25 so as to be capable of turning in a clockwise direction to give access to the interior for purposes of replacement. The copy strip 5 will generally consist of a suitable grade of paper but if required, the copy may be produced on a variety of different unsensitized materials. After leaving the reel 21, the strip passes between a pair of rollers 30 and 31 which serve as a guide leading the strip into contact with the surface of the original 1.

The roller 6 closes a reservoir 32 for powdered ink 33 which may be of the type referred to in the above identified earlier application. A thin film of this powdered ink is thus transferred to the surface of the roller, any excess being removed by the edge of the opening in the reservoir 32. In the position of the apparatus shown in FIGURE 1 the roller 6 is clear of the copy strip 5 but if the apparatus is turned slightly in a clockwise direction, for example, by depression of the handle 2, the roller 3 is raised from the surface of the original and the roller 6 is lowered, this position being indicated by the inclined dotted line 5a which represents the surface of the copy strip during development.

In operation the end of the copy strip 5 is withdrawn and is held against the supporting surface either by hand or preferably by means of a clip 35 as shown in the drawing. This is located just to the right of the edge of the original so that the roller 3 bears against the edge of the original, thus ensuring that the whole of the original to be copied receives the necessary film of vaporizing agent. From this position the apparatus is moved by hand to the left into the position shown in FIGURE 1. As the result of this movement, the roller 3 applies the film of vaporizing agent to the surface of the original and immediately thereafter the strip 5 is paid out into contact with the coated surface of the original. The lamp 4 then produces the selective distillation of the vaporizing agent on to the undersurface of the strip 5, the uppersurface of the strip being cooled by the action of the fan 13. The lamp 4 is controlled by a switch (not shown) and when the apparatus has been moved to a position such that the lamp has reached the extreme left-hand end of the original and has been brought to a stop, the lamp is switched off and a complete latent image will thus be in position on the underside of the strip 5. The clip 35 is then removed and the length of strip bearing the latent image is torn off, a small blade 36 being provided adjacent the roller 31 for this purpose. The length of strip is then inverted and is again held in position by means of a clip shown as 35a, this position of the strip being indicated as 5a as referred to above. The complete apparatus is then again passed over the strip 5 one or more times but without the lamp 4 switched on. This causes a thin layer of powdered ink to be transferred to the latent image, the action of the roller 6 being such as to transfer ink only to the areas bearing the condensed vaporizing agent and to leave the other areas clean. The inked image then requires fixing and for this purpose the apparatus still in the depressed position is passed over the copy strip finally from left to right with the lamp 4 switched on. The heat from the lamp 4 then produces the necessary fixing action on the thermoplastic ink particles causing them to fuse and thus constitute a permanent image. Further copies are made by repeating the process as desired.

FIGURE 2 shows a minor modification of the apparatus of FIGURE 1 in that the lamp 4 is mounted within an outer cylinder 40 of heat resistant transparent material which serves as a guide for the copy strip 5. With this arrangement guide rollers 41 and 42 are mounted somewhat higher than the rollers 30 and 31 of FIGURE 1, but as in the previous arrangement, a blade 43 is provided for tearing off the strip 5 after the completion of the first passage of the apparatus.

The alternate form of apparatus shown in FIGURE 3 is intended to produce a developed image as the result of a single passage in relation to the original to be copied. The apparatus shown is not provided with a handle as in the apparatus of FIGURE 1. A handle is not essential in either embodiment since the casing of the apparatus can be gripped directly. Also, the apparatus of either embodiment may be secured to a fixed mounting and the original moved in relation to it.

Many of the components of the apparatus of FIGURE 3 are the same as those of FIGURE 1 and are identified by the same reference numerals. The essential difference in the construction of FIGURE 3 is that the copy strip 5, after passing the lamp 4, re-enters the apparatus by way of a guide defined by a roller 50. Thus, the path of the strip 5 is from the reel 21, around the roller 31, past the lamp 4, around the roller 50, around the further rollers 51 and 52 where the inking operation takes place and then between a pair of feed rollers 53, after which it emerges through an opening 54 in the casing which is indicated as 55.

Although the roller 3 may operate in the same manner as in FIGURE 1, an alternate device for the application of vaporizing agent is illustrated. This is in the form of a porous roller 60 packed with an absorbent material impregnated with vaporizing agent 61. The vaporizing agent percolates outwardly into contact with the surface of the roller 3 and once again the doctor roller 12 serves to spread the film evenly and to remove any excess. This doctor roller again provides the drive to the fan 13 and also to the feed rollers 53 by way of a drive shown in dotted lines at 62. The roller 53 in its turn drives a small conveyor belt 63 by way of a belt 64.

The conveyor 63 is provided with a series of small ridges and constitutes the bottom of a reservoir 65 for powdered ink 66. The conveyor 63 is driven so that its upper run moves to the right carrying with it a thin film of powdered ink. This clings to the surface of the belt and builds up to form a pool 67 in the vicinity of the roller 52. The flexible bottom edge 68 of the left-hand wall of the reservoir 65 extends into contact with the surface of the belt 63 and the repeated engagement between this end of the wall and the ridges on the inked belt produces vibration of the belt and wall so that the pool of ink 67 is maintained in a continuous state of agitation which enables it to be transferred effectively to the latent image on the strip 5. Developing apparatus of this general type is more fully disclosed in my copending application, Serial No. 252,239, filed January 17, 1963. The inked image then passes upwardly past the end of a duct 70 leading from the vicinity of the lamp 4, a reflector 71 being formed with an opening leading to the duct 70 to allow the passage of radiation and hot air along the duct. This heat acts on the copy strip 5 and thus serves to fix the inked image.

In operation the apparatus is moved to the left over the original in the same manner as in FIGURE 1 so that the roller 3 applies a film of vaporizing agent to its surface. As in the previous embodiments, the heat from the lamp 4 produces distillation of the vaporizing agent to produce a latent image on the underside of the strip 5. The strip 5 then passes through the ink pool 67 where the latent image is inked and then passes the end of the duct 70 where the image is fixed. The strip then passes through the opening 54 and when the complete image has emerged, the apparatus is stopped and the copy thus produced is torn off.

The drive to the various rollers is derived from the roller 12 as already described and this in its turn takes its drive from the roller 3. It is, therefore, important that the roller 3 should itself receive a positive drive whether the apparatus is moved over the original or the apparatus is fixed and the original fed beneath it.

FIGURES 6 and 7 show arrangements of fixed apparatus. In FIGURE 6 a continuous belt 75 is driven by rollers 76 and 77. The original to be copied is attached to the belt 75 which feeds it beneath the roller 3 and over a platen 78. The upward pressure of the belt on the roller 3 then serves to drive the remainder of the apparatus. In FIGURE 7, the belt 75 is replaced by a drum 79 to which the original is attached. With this arrangement the roller 3 needs to be lowered slightly so as to receive adequate drive from the surface of the drum.

FIGURES 4 and 5 show alternate forms of inking devices for use in the apparatus of FIGURE 3. In the device of FIGURE 4 a belt 80 is formed with ridges in a similar manner to the belt 63 and passes around rollers 81 and 82, the former of which is driven from the feed roller 53 by the drive 64. In the vicinity of the roller 52, however, the belt is caused to pass round a sharp corner defined by a doctor wire 83. This wire scrapes the powdered ink from the surface of the belt and by co-operating with the ridges sets up a vibration in the same manner as described with relation to the end of the wall of the reservoir 68 in connection with FIGURE 3. As a consequence, the powdered ink removed from the belt 80 builds up to form a pool 84 which is maintained in a state of agitation so as to be transferred to the latent image as the copy strip 5 passes around the roller 52.

In the construction of FIGURE 5 the ink is transferred from the reservoir 65 to the copy strip 5 by means of a pair of inking rollers 85 and 86. Each of these rollers is covered with a skin of latex or similar material which picks up a thin film of the powdered ink and transfers it to the latent image on the copy strip 5. With this arrangement the path of the copy strip is slightly modified in that after passing over the roller 50, it does not double back on itself but passes directly to a further roller 87 from which it is drawn upwardly by the feed rollers 53.

With each of the forms of apparatus illustrated the original does not have to be passed into the apparatus itself. It is either carried on a fixed support over which the apparatus is moved as illustrated in FIGURES 1 to 3, or, alternately, it is attached to a moving support such as the belt 75 of FIGURE 6 or the drum 79 of FIGURE 7 which carries the original past the copying apparatus. In either case this leads to the production of a latent image which may be inked and developed either during the same passage or during subsequent passages of the apparatus in relation to the strip of copy material.

I claim:

1. Apparatus for producing a copy of an original comprising a housing moveable relative to the original to be copied, applicator means mounted in said housing to apply a coating of a vaporizing agent to a surface of the original while the original is located without said housing, supply means mounted in the housing to supply a copy material surface in adjacency with the coated surface of the original while the coated original is located without said housing, and infra-red radiation means mounted in said housing to heat image areas of the original and to transfer vaporizing agent to the surface of the copy material surface adjacent said original in a pattern corresponding to the original without introducing said original into said housing.

2. Apparatus for producing a copy of an original comprising a housing moveable relative to the original to be copied, applicator means comprising a roller mounted in said housing such that a portion of said roller protrudes from said housing to apply a coating of a vaporizing agent to a surface of the original while the original is located without said housing, supply means comprising reel means and guide means to provide a strip of copy sheet material in adjacency with the coated original at a point located outside said housing and rearward of said roller, and infra-red radiation means within said housing rearward of said guide means to expose the adjacent original and copy sheet material to heat image areas of the original and to transfer vaporizing agent to the surface of the copy sheet material adjacent said original in a pattern corresponding to the original without introducing said original into said housing, said rearward locations being in reference to the motion of the original relative to the housing.

3. Apparatus for producing a copy of an original comprising a housing moveable relative to the original to be copied, applicator means mounted in said housing to apply a coating of a vaporizing agent to a surface of the original while the original is located without said housing, supply means mounted in the housing to supply a copy material surface in adjacency with the coated surface of the original while the coated original is located without said housing, infra-red radiation means mounted in said housing to heat image areas of the original and to transfer vaporizing agent to the surface of the copy material surface adjacent said original in a pattern corresponding to the original without introducing said original into said housing, and ink supply means to coat the vaporizing agent transferred to the copy sheet material to form a developed image of the original.

4. Apparatus for producing a copy of an original comprising a housing moveable relative to the original to be copied, applicator means comprising a roller mounted in said housing such that a portion of said roller protrudes from said housing to apply a coating of a vaporizing agent to a surface of the original while the original is located without said housing, supply means comprising reel means and guide means to provide a strip of copy sheet material in adjacency with the coated original at a point located outside said housing and rearward of said roller, infra-red radiation means within the housing rearward of said guide means to expose the adjacent original and copy sheet material to infra-red radiation to heat image areas of the original and to transfer vaporizing agent to the surface of the copy sheet material adjacent said original in a pattern corresponding to the original without introducing said original into said housing, means to separate the copy sheet material from the original, and ink supply means to coat the vaporizing agent transferred to the copy sheet material to produce a developed image, said rearward locations being in reference to the motion of the original relative to the housing.

5. Apparatus as claimed in claim 4 further including means for fixing the developed image.

6. Apparatus as claimed in claim 4 including cooling means to cool the copy sheet material to assist condensation of the vaporizing agent on the copy sheet material in a pattern corresponding to the original.

7. Apparatus as claimed in claim 4 wherein said source of infra-red radiation comprises a lamp mounted within a cylinder of infra-red transparent material serving as a guiding surface for said copy sheet material.

References Cited by the Examiner

UNITED STATES PATENTS

| | | | |
|---|---|---|---|
| 2,503,759 | 4/1950 | Murray | 250—65 |
| 2,740,895 | 4/1956 | Miller | 250—65 |
| 2,770,534 | 11/1956 | Marx | 250—65 |
| 2,927,210 | 3/1960 | O'Mara | 250—65 |
| 3,081,699 | 3/1963 | Gulko | 250—65 |

RALPH G. NILSON, *Primary Examiner.*

ARCHIE R. BORCHELT, *Examiner.*

W. F. LINDQUIST, *Assistant Examiner.*